April 26, 1955

C. GERST 2,707,057

TRACTOR SHOVEL

Filed Aug. 16, 1951

INVENTOR.
CHRIS GERST
BY
Gustav A. Wolff
ATT.

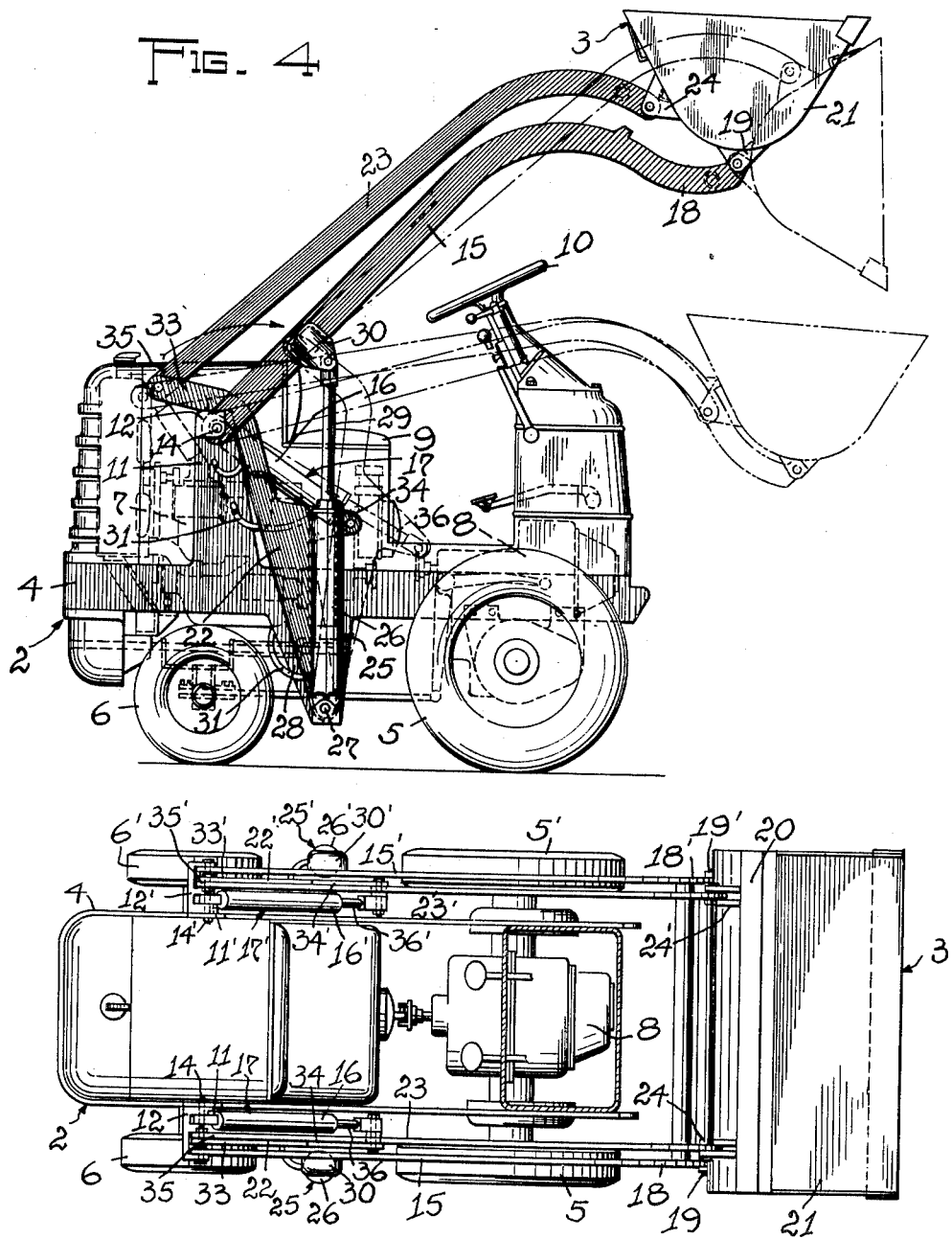

United States Patent Office 2,707,057
Patented Apr. 26, 1955

2,707,057

TRACTOR SHOVEL

Chris Gerst, Detroit, Mich., assignor, by mesne assignments, to Westinghouse Air Brake Company, a corporation of Pennsylvania Application August 16, 1951, Serial No. 242,095

12 Claims. (Cl. 214—140)

The present invention relates in general to material handling and transferring equipment and, more particularly, to tractor-propelled, power-operated shovels of the type in which the shovel structure is hingedly mounted at the front of the tractor on the end of a boom hinged to the tractor, and in which the boom is actuated by hydraulic means effecting rocking of the boom and shovel structure to digging, transport and dumping positions.

The general object of the invention is the provision of an improved, tractor-propelled, power-operated shovel of the type referred to above which is of simple, efficient and economic construction and which includes hydraulically actuated boom means pivotally mounting the shovel structure and hydraulically actuated guide means coupled with the shovel structure to permit individual or automatic control of the angular relation between boom and shovel structure in its digging, transport and dumping positions.

A further object of the invention is the provision of a tractor-propelled, power-operated shovel of the type referred to above in which the hydraulically actuated guide means include a tilting lever means mounted on the frame of the tractor and linked to the shovel structure.

Still another object of the invention is the provision of a tractor-propelled, power-operated shovel of the type referred to above in which the boom-actuating hydraulic means and the tilting lever means for the shovel structure are pivotally mounted on the frame structure of the shovel on axially aligned pivots, and in which the tilting lever actuating hydraulic means and the boom are pivotally mounted on the frame structure of the shovel on axially aligned pivots arranged in laterally-spaced relation with respect to the said first axially-aligned pivots.

Additional and still further objects and novel features of construction, combination and relations of parts by which the objects in view have been attained will appear and are set forth in detail in the course of the following specification.

The drawings accompanying and forming part of the specification illustrate a certain practical embodiment of the invention, but it will be apparent as the specification proceeds that the structure may be modified and changed in various ways, without departure from the true spirit and broad scope of the invention.

Figure 1:
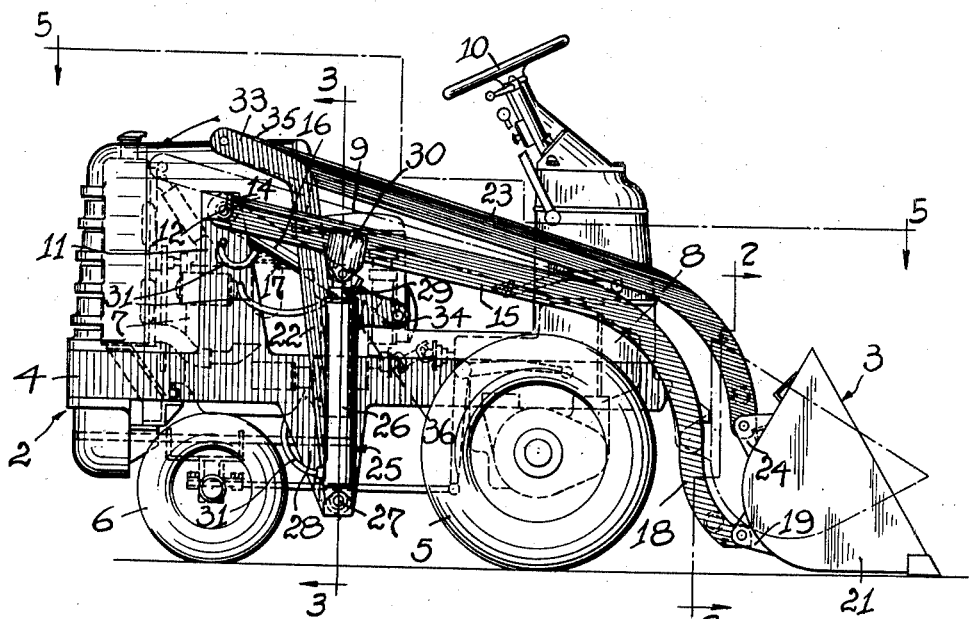
Fig. 1 is a side view of a tractor-propelled, power-operated shovel embodying the invention, with the shovel structure shown in full lines in lowered digging position and in dash-dotted lines in upwardly tilted digging position.
Figure 2:
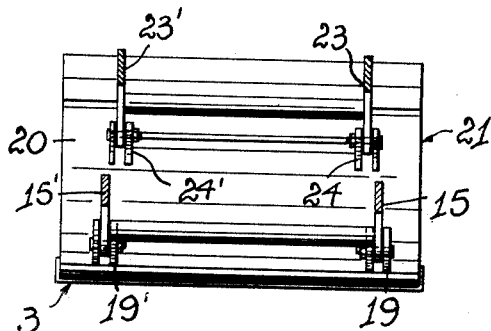
Fig. 2 is a sectional view on line 2—2 of Fig. 1 showing the pivotal connection of the boom and link members with the shovel structure.
Figure 3:
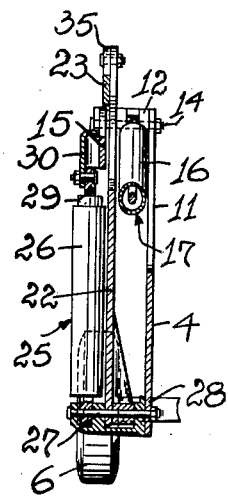
Fig. 3 is a sectional view partly in elevation through the hydraulic means controlling the boom and the hydraulic means controlling the tilting lever means, the section being taken on line 3—3 of Fig. 1.

Fig. 4 is a side view similar to Fig. 1 except that the shovel structure is shown in full lines in fully raised position prior to dumping operations, in dash-dotted lines after dumping operations and in double dash-dotted lines in an intermediate or transport position; and Fig. 5 is a horizontal sectional view partly in elevation through the tractor-propelled, power-operated shovel shown in Figs. 1 and 4, the section being taken on line 5—5 of Fig. 1.

Referring now in detail to the exemplified form of the invention shown in the drawings, the tractor-propelled, power-operated shovel disclosed therein includes an engine-propelled tractor vehicle 2 which mounts a power operated shovel 3. Tractor vehicle 2 which may be of any suitable design embodies a frame structure 4 with front and rear wheels 5, 5' and 6, 6', an engine 7 mounted on the rear portion of the frame structure, a transmission 8 arranged at the front portion of the frame structure and directly geared to the front or driving wheels 5, 5', an operator's seat 9 and a steering wheel 10 positioned above transmission 8. The frame structure 4 of the tractor vehicle 2 includes upwardly extended, oppositely arranged portions 11, 11' mounting laterally extended therefrom bracket members 12, 12', which are rigidly secured to said portions in any suitable manner. Bracket members 12, 12' have extended therethrough pivot shafts 14, 14', respectively, which are extended through portions 11, 11' and non-rotatably secured thereto to form stationary pivot shafts freely pivotally supporting the inner ends of hoisting levers 15, 15' and cylinders 16, 16' of hydraulic cylinder means 17, 17' as will be later described. Hoisting levers 15, 15' have their outer ends 18, 18' pivoted to bracket members 19, 19' secured to the curved outer face of the rear wall 20 of a bucket-like shovel structure 21, thus providing a hinge connection of hoisting levers 15, 15' with the shovel structure. In addition shovel structure 21 is supported in desired angular relation with respect to hoisting levers 15, 15' by hydraulically actuated tilting levers 22, 22' linked to shovel structure 21 by link members 23, 23' hinged to brackets 24, 24' which extend from the rear wall 20 of shovel structure 21.

The rocking movement of hoisting levers 15, 15' and the shovel structure 21 supported thereby is controlled by double-acting cylinder piston arrangements 25, 25', respectively, which include cylinder members 26, 26' hinged by pins 27, 27' to downwardly-extended, oppositely-arranged portions 28, 28' of the frame structure 4 and, furthermore, include piston members 29, 29' hinged to brackets 30, 30' attached to the respective hoisting levers 15, 15'. The cylinder piston arrangements, as customary, are actuated and controlled by a hydraulic fluid system (not shown and not forming part of the invention) which system transfers fluid under pressure to the opposite ends of cylinder members 26, 26' as indicated by pressure hose members 31.

Rocking movement of shovel structure 21 on the hoisting levers 15, 15' is controlled by the hydraulically actuated tilting levers 22, 22' and the link members 23, 23' connecting the levers 22, 22' with the shovel structure. The tilting levers which are fulcrumed on pins 27, 27' on downwardly extended frame portions 28, 28' include at their upper ends rearwardly extended arm portions 33, 33' and between their ends forwardly extended arm portions 34, 34'.

Arm portions 33, 33' are hinged to the inner end portions 35, 35' of the link members 23, 23', respectively, and arm portions 34, 34' are hinged to the respective pistons 36, 36' of hydraulic cylinder means 17, 17', respectively, the cylinders 16, 16' of which are pivotally mounted on pivot shafts 14, 14' as described above. The above described arrangement effects an alignment of the fulcrums of hoisting levers 15, 15' and cylinders 16, 16' and facilitates individual tilting of shovel structure 21 by the levers 22, 22' in any postiion of the hoist levers 15, 15'. Such an arrangement permits location of the cylinder piston means 17, 17' in the middle portion of the tractor at a place distant from the material to be handled and also simplifies the automatic control of the rocking movement of the shovel structure when same is elevated from loading to transport and dumping position by properly locating the pivot supports for link members 23, 23' with respect to the stationary pivots mounting the inner ends of the hoisting levers 15, 15'.

Loading operation of a tractor-propelled, power-operated shovel of the type described is effected by driving the tractor vehicle 2 with shovel structure 21 in its lowered position (see Fig. 1) into the material to be loaded and simultaneously, by actuation of hydraulic cylinder means 17, 17' tilting the shovel structure upwardly to full load carrying position (see in Fig. 1 the dash-dotted line position of the shovel structure). When fully loaded shovel structure 21 is raised by hydraulic piston arrangements 25, 25' to transport position, as shown in double dash-dotted lines of Fig. 4, which position gives the operator unobstructed view for driving the loaded, tractor-propelled shovel to the place of deposit of its load. At the place of deposit shovel structure 21 is raised, if required, and the load is dumped by tilting the shovel structure to dumping position (see dash-dotted lines in Fig. 4).

After dumping operations the shovel structure 21 by operation of hydraulic cylinder means 17, 17' and cylinder piston arrangements 25, 25' is lowered and tilted back to load carrying position, permitting the operator unobstructed view in returning the tractor-propelled, power-operated shovel back to the loading point for further loading operations.

Having thus described my invention what I claim is:

1. In a power-operated tractor shovel having power-actuated hoisting levers fulcrumed at their inner ends to the tractor of the shovel and a shovel structure rockingly mounted on the outer ends of the hoisting levers, a rocking arrangement for the shovel structure including tilting lever means pivotally connected with their one ends to said tractor and linked with their other ends to said shovel structure, and hydraulic cylinder means pivoted with their one ends to the tractor at points axially aligned with the fulcrum connections of said hoisting levers with the tractor, said hydraulic means having their other ends pivoted to the tilting lever means between the opposite ends thereof.

2. In a power-operated tractor shovel having power-actuated hoisting lever means fulcrumed at one end to the tractor of the tractor shovel and a shovel structure rockingly mounted on the other end of the hoisting lever means, a rocking arrangement for the shovel structure including unitary tilting lever means formed with three arm portions, one of which is hinged to the tractor and the second one of which is linked to said shovel structure, and hydraulic means hingedly connected at one end to the tractor at a point axially aligned with the fulcrum connection of the hoisting lever means with the tractor and at the other end to the third arm portion of said tilting lever means to effect by said hydraulic means independent actuation of the tilting lever means in all positions of the hoisting lever means for independent, controlled rocking movements of the shovel structure on the hoisting lever means.

3. A power-operated tractor shovel of the type described in claim 2, wherein the second and third arm portions of the tilting lever means extend in substantially opposite directions with respect to each other.

4. A power-operated tractor shovel of the type described in claim 2, wherein the tilting lever means has the said one arm portion hinged to the tractor forwardly of the fulcrum connection of the hoisting lever means with the tractor, wherein the second arm portion of said tilting lever means extends rearwardly of the connection of the said one arm portion with said tractor, and wherein the third arm portion extends forwardly of the last named connection of the said one arm portion with the tractor.

5. In a power-operated tractor shovel including a frame, hoisting levers pivoted with their inner ends to said frame and a shovel structure rockingly mounted on the outer ends of the hoisting levers, hydraulic cylinder means hinged with their opposite ends to the frame and the hoisting levers of the tractor shovel, a power-actuated rocking arrangement for the shovel structure including tilting lever means linked to the shovel structure and hinged to the frame of the tractor shovel at a point axially aligned with the hinge connection between said hydraulic cylinder means and frame, and other hydraulic cylinder means hinged at their one ends to the frame at points axially aligned with the pivotal connections of said hoisting levers and frame and hinged at their other ends to the tilting lever means.

6. A power-operated tractor shovel as described in claim 5, wherein each tilting lever means consists of a unitary lever member formed with three arms, two of such arms being extended from the lever member in substantially opposite directions with respect to each other and in angular relation with respect to the third arm, and wherein each tilting lever means by its third arm is hinged to the frame of the tractor shovel.

7. A power-operated tractor shovel as described in claim 6, wherein each tilting lever means is dimensioned to extend with one of its arms above the fulcrums of said hoisting levers, and wherein the said one arm of each tilting lever is linked to the shovel structure by link members extending above the hoisting levers of the tractor shovel.

8. In a power-operated tractor shovel a frame including upwardly and downwardly extended portions, hoisting lever means hinged at their inner ends to the upwardly extended portions of said frame, a shovel structure hinged to the outer ends of said hoisting lever means, elongated hydraulic cylinder means hinged with their one ends to the downwardly extended portions of said frame and with their other ends to the hoisting lever means between opposite ends thereof, tilting lever means hinged at their one ends to the downwardly extended portions of said frame to axially align the frame hinge connections of the hydraulic cylinder means with the hinge connections of said tilting lever means, link members connecting the other ends of said tilting lever means with said shovel structure, and other hydraulic cylinder means having their one ends hingedly connected to the upwardly extended frame portions to axially align the frame hinge connections of said hoisting levers with the hinge connections of the other hydraulic means and their other ends hingedly connected to the tilting lever means between opposite ends thereof.

9. In a power-operated tractor shovel, a frame, a shovel structure, hoisting levers hinged to said frame and the shovel structure, tilting levers hinged to said frame and connected by link means to said shovel structure, hydraulic cylinder piston means for raising and lowering said hoisting levers and other hydraulic cylinder piston means for tilting said tilting levers, the said first hydraulic cylinder piston means being with their one ends hinged to said frame at points axially aligned with the hinge connection between said tilting levers and frame, and said other hydraulic cylinder means being with their one ends hinged to said frame at points axially aligned with the hinge connections between said hoisting levers and frame.

10. In a material handling apparatus having a hoisting lever pivotally supported at its inner end and a material handling member rockingly mounted on the outer end of said hoisting lever, a first hydraulic piston and cylinder means pivoted at one end to said apparatus at a point located a substantial distance below the axis of the pivotal support of the inner end of said hoisting lever and pivoted at the other end to said hoisting lever between the ends thereof, a rocking arrangement for said material handling member including a tilting lever pivoted at one end to said apparatus on an axis aligned with the pivotal connection between said first hydraulic means and said apparatus and having its other end extended above said inner end of said hoisting lever, a link member pivoted to said material handling member and to said other end of said tilting lever, and other hydraulic piston and cylinder means pivoted at one end to said tilting lever between the ends thereof and pivotally supported at its other end on an axis aligned with the axis of the pivotal support of said inner end of said hoisting lever.

11. In a material handling apparatus including a tractor provided with front and rear wheels, a frame, and an engine mounted on the frame above the rear wheels of the tractor, hoisting lever means pivotally supported at its inner end on an axis located a substantial distance and vertically above the axis of said rear wheels, a material handling member pivoted to the outer end of said hoisting lever means, hydraulic piston and cylinder means pivoted at one end to said frame on an axis located between said front and rear wheels and a substantial distance below the axis on which said hoisting lever means is pivoted and pivotally connected at the other end thereof to an intermediate portion of said hoisting lever means, tilting lever means pivotally mounted on said frame on an axis aligned with the pivotal connection between said hydraulic means and said frame, link means pivoted to said material handling member and to said tilting lever means, and other hydraulic means pivoted at one end to an intermediate portion of said tilting lever means and pivotally supported at the other end thereof on an axis aligned with the axis on which said hoisting lever means is pivoted.

12. In a material handling apparatus including a frame having a power-operated hoisting lever provided with a supporting pivot at its inner end and a material handling member rockingly mounted on the outer end of said hoisting lever, a rocking arrangement for said material handling member including a tilting lever pivotally connected at one end to said frame at a point below and laterally offset relative to said hoisting lever pivot, a link member pivoted to the other end of said tilting lever and to said material handling member, and hydraulic piston and cylinder means pivoted at one end to the medial portion of said tilting lever at a point offset relative to its opposite pivotally connected and pivoted ends, said cylinder means being pivotally supported at its other end coaxially relative to the said supporting pivot for the inner end of said hoisting lever.

References Cited in the file of this patent

UNITED STATES PATENTS

| | | |
|---|---|---|
| 939,393 | Clippinger et al. | Nov. 9, 1909 |
| 2,348,899 | Guignard et al. | May 16, 1944 |
| 2,397,530 | Brosius | Apr. 2, 1946 |
| 2,415,515 | McOscar | Feb. 11, 1947 |